Dec. 22, 1970   J. A. CARLSON, JR., ET AL   3,548,568
METHODS OF AND APPARATUS FOR LIQUID-VAPOR
CONTACT AND PHASE SEPARATION
Filed March 6, 1967   5 Sheets-Sheet 4
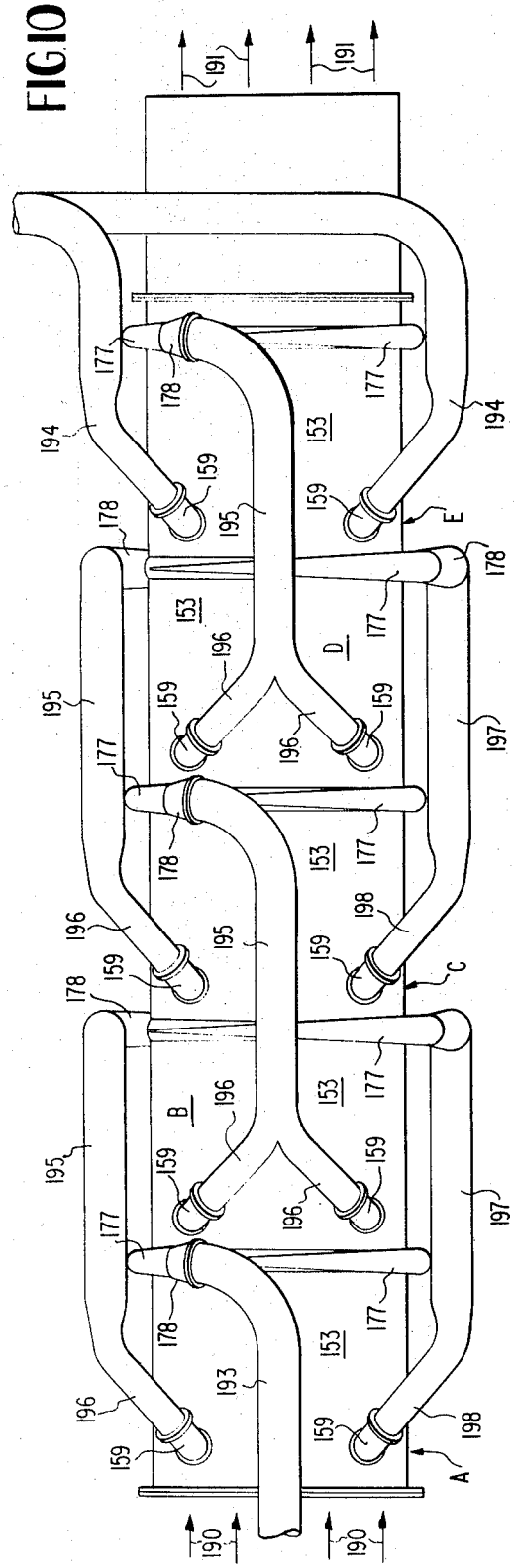
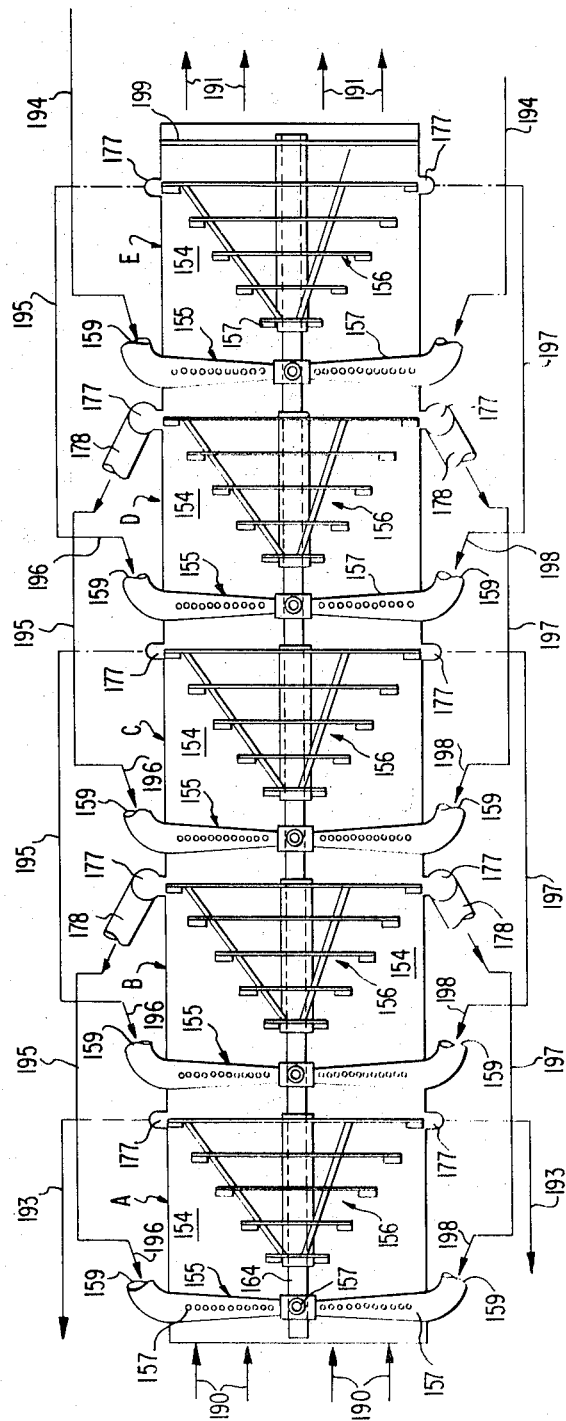
INVENTORS
JOHN A. CARLSON, JR.
ALAN H. SINGLETON
PHILIP D. STELTS
BY
Shanley & O'Neil
ATTORNEY

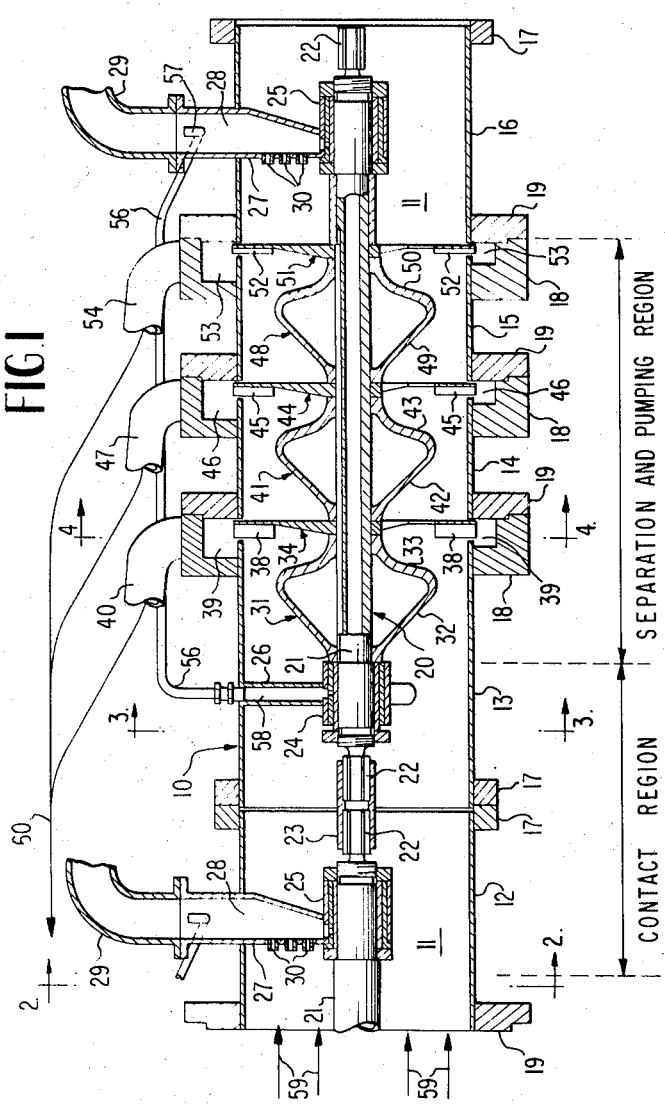

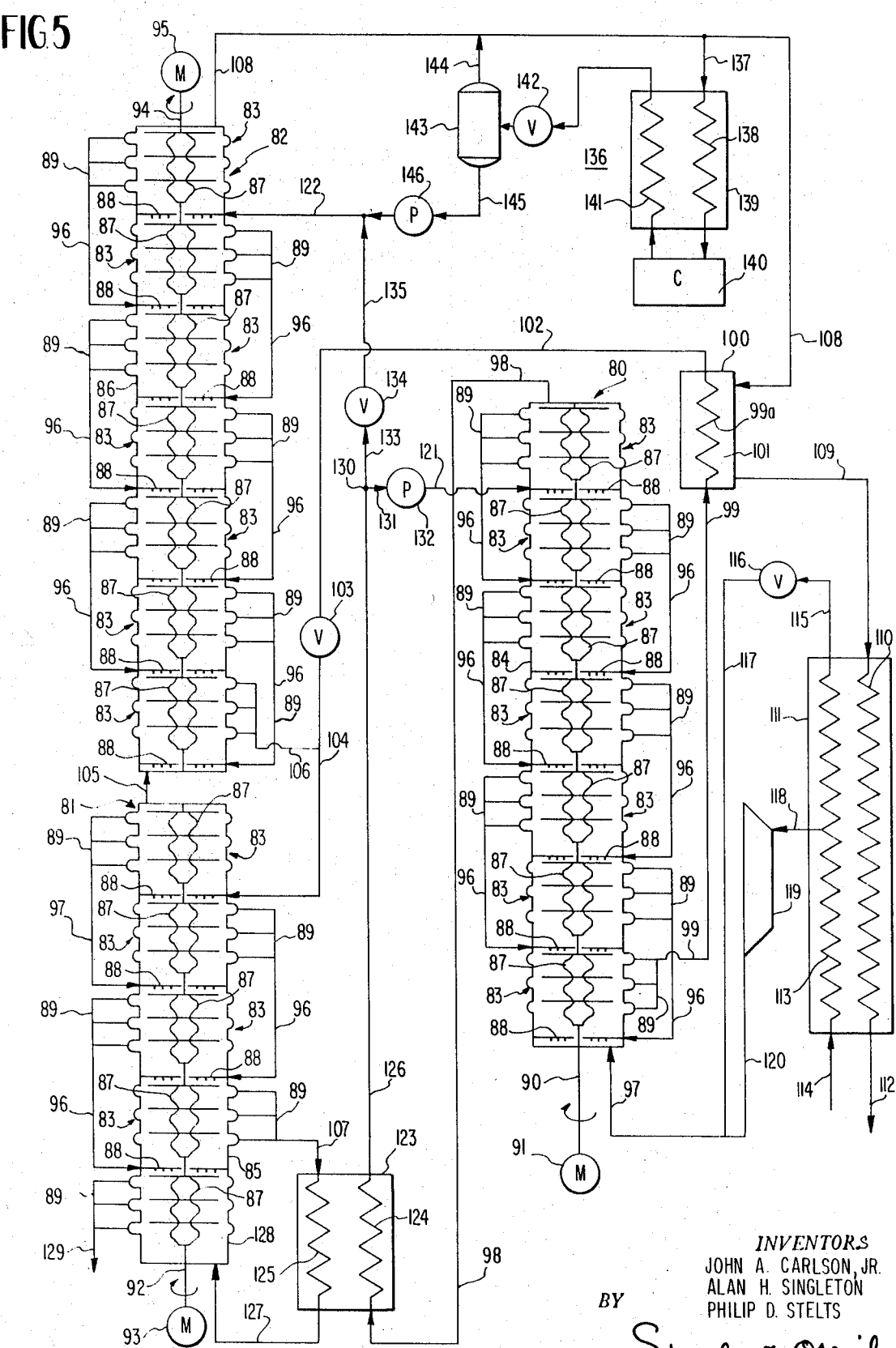

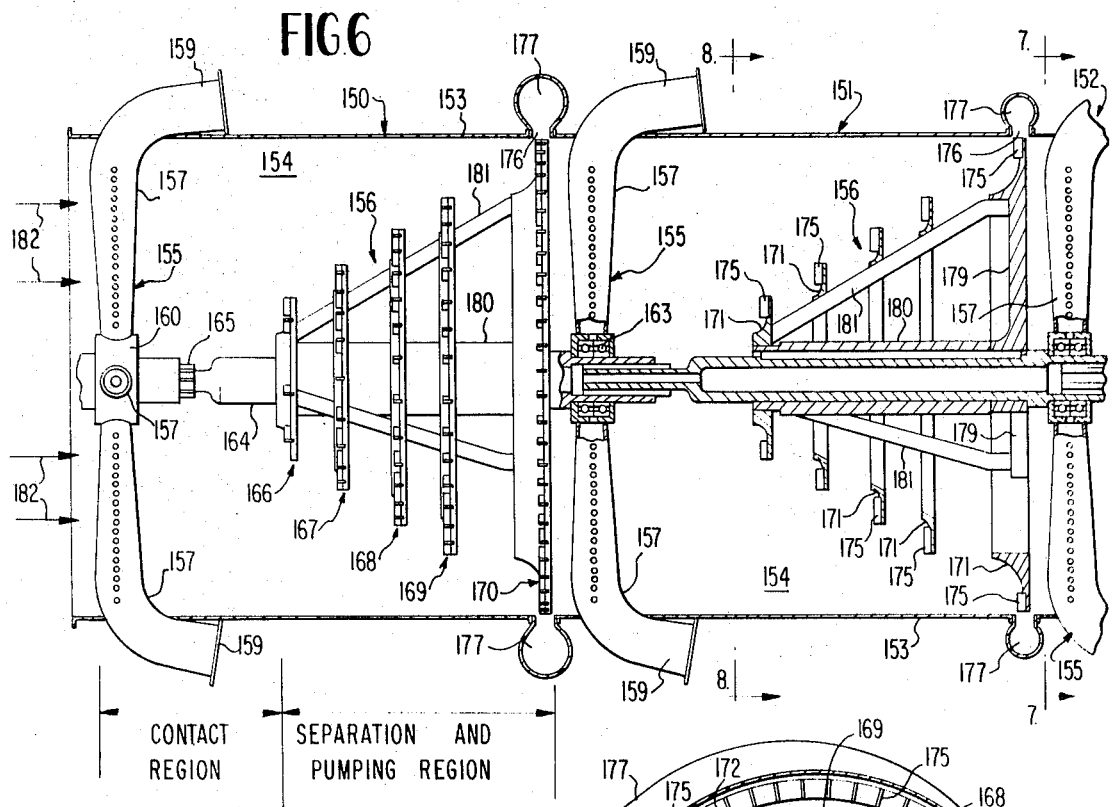
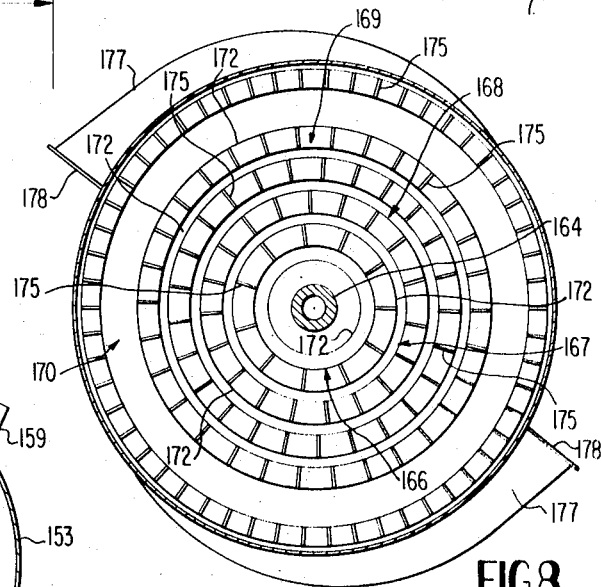
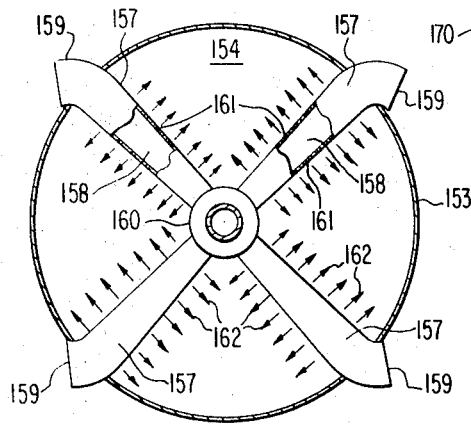
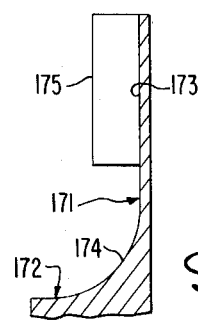

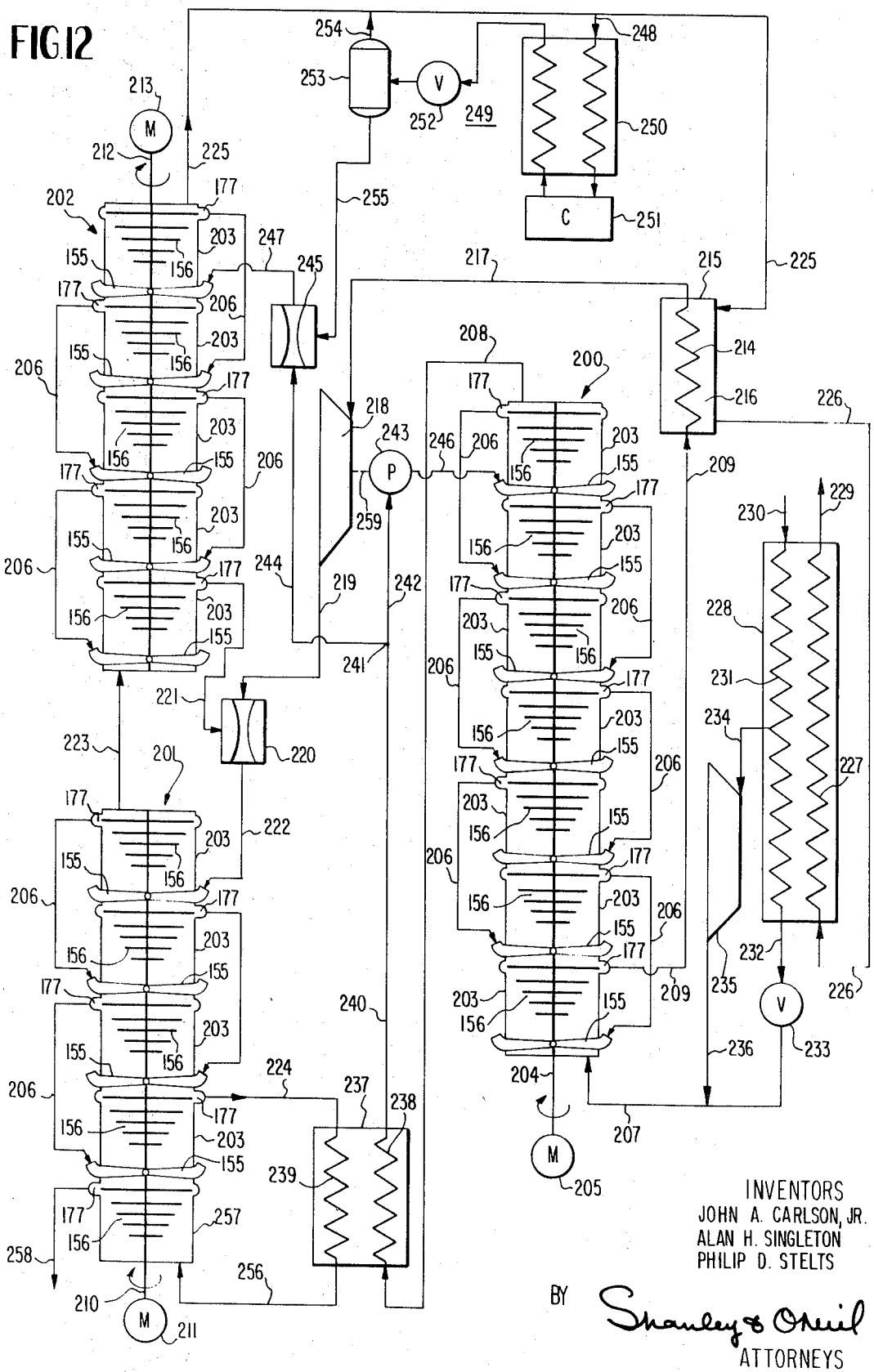

+# United States Patent Office 3,548,568
Patented Dec. 22, 1970

3,548,568
METHODS OF AND APPARATUS FOR LIQUID-VAPOR CONTACT AND PHASE SEPARATION
John A. Carlson, Jr., Alan H. Singleton, and Philip D. Stelts, Cleveland, Ohio, assignors to Air Products and Chemicals, Inc., Allentown, Pa., a corporation of Delaware
Filed Mar. 6, 1967, Ser. No. 620,826
Int. Cl. B01d 47/00
U.S. Cl. 55—84                           16 Claims

ABSTRACT OF THE DISCLOSURE

Method and apparatus including liquid-vapor contact and mass transfer arrangements involving the injection of liquid into vapor in combination with liquid-vapor separator arrangements of the rotating type. The liquid-vapor separator arrangements may be used alone and the combination may be used as a single unit or as a plurality of units connected in series relation to effect stripping, scrubbing or rectification processes; multiple-stage fractionating systems employing the different arrangements are disclosed.

BACKGROUND OF THE INVENTION

This invention relates to improvements on methods of and apparatus for separation of gaseous mixtures into component gases and for the separation of liquid-vapor mixtures into the liquid phase portion and the vapor phase portion.

In the separation of a gaseous mixture containing a high boiling point component and a low boiling point component by rectification, surface interaction is established between vapor and liquid phases of the gaseous mixture to effect mixing of the phases and establishing a state of equilibrium therebetween to form a liquid of a composition containing a greater percentage and a vapor of a composition containing a less percentage of the high boiling point component of the gaseous mixture. By separating the liquid and vapor phases of different composition and by repeating the equilibrium establishing and phase separation processes, it is possible theoretically to obtain a vapor consisting of the lower boiling point component and a liquid consisting of the high boiling point component of the gaseous mixture. Conventional rectifying columns include fractionating trays or structure to bring about surface interaction between the liquid and vapor phases; however, it is known that complete equilibrium between the liquid and vapor phases is not achieved. This is one of the reasons why the number of fractionating plates actually required exceeds the number of fractionating plates theoretically necessary to effect a certain separation.

The present invention provides a novel process of rectification and apparatus for performing the process which brings about an improved surface interaction between liquid and vapor phases and obtains a high order of equilibrium therebetween unobtained by the prior art. This is accomplished by the provision of a novel "rectification process" or "rectification unit" including the steps of or apparatus for bringing about a high degree of intimate intermixing of the liquid and vapor phases to achieve a high order of equilibrium therebetween and separation of the resulting liquid and vapor phases of different composition under such conditions as to permit further rectification by additional rectification process steps or rectification units for the purpose of separating the feed into a liquid fraction relatively richer in the higher boiling component and a vapor fraction relatively richer in the lower boiling component. It will be appreciated from the foregoing that, although the present invention is disclosed and described in the environment of low temperature separation of gaseous mixtures, specifically air, the present invention has utility in processes involving the exchange of mass and heat between liquid and vapor phases and the separation of liquid and vapor phases, including but not necessarily limited to processes involving scrubbing and stripping operations.

Among the objects of the present invention are to provide a novel process of and apparatus for effecting rectification of gaseous mixtures with improved efficiency which involves the combination of novel process and apparatus for effecting highly efficient heat transfer and mass transfer between liquid and vapor phases and a novel process of and apparatus for effecting separation of liquid and vapor phases, each of which has utility independently of the combination.

Other objects and features of the present invention will appear more fully from the following detailed description when considered in connection with the accompanying drawings which disclose several embodiments of the invention. It is to be expressly understood, however, that the drawings are designed for purposes of illustration only and not as a definition of the limits of the invention, reference for the latter purpose being had to the appended claims.

SUMMARY OF THE INVENTION

Liquid-vapor contact method and apparatus in which atomized liquid is injected into vapor in a direction different from the direction of vapor flow to establish a stable liquid-vapor mixture of a high order of equilibrium and in which the liquid-vapor mixture is separated by flowing the mixture into contact with rotating surfaces inclined outwardly relative to the direction of flow; the method and apparatus cover operations including single and multiple stages and embody various processes including liquid-vapor contact and phase separation including separation of gaseous mixtures into component gases by a multi-stage fractionating system.

BRIEF DESCRIPTION OF THE DRAWINGS

In the drawings, in which similar reference characters disclose similar elements throughout the several views:

FIG. 1 is a diagrammatic showing, in section, of a novel rectification unit provided by the present invention;

FIG. 2 is a view in section taken along the line 2—2 of FIG. 1;

FIG. 3 is a view in section along line 3—3 of FIG. 1;

FIG. 4 is a view in section taken along line 4—4 of FIG. 1;

FIG. 5 is a diagrammatic showing of a novel low temperature fractionating cycle embodying the novel rectification unit shown in FIG. 1;

FIG. 6 is a view, partly in section, of a plurality of rectification units constructed according to the preferred embodiment of the invention;

FIG. 7 is a view in section along line 7—7 of FIG. 6;

FIG. 8 is a view in section along line 8—8 of FIG. 6;

FIG. 9 is an enlarged fragmentary view of a portion of the rectification unit shown in FIG. 6;

FIG. 10 is a plan view of a rectifying apparatus including a plurality of rectifying units of the type shown in FIG. 6;

FIG. 11 is a diagrammatic showing, partly in section, of the fractioning apparatus shown in FIG. 9; and FIG. 12 is a diagrammatic showing of a novel fractioning cycle constructed in accordance with another embodiment of the present invention.

DESCRIPTION OF THE PREFERRED EMBODIMENTS

The novel rectifying unit provided by the present invention is shown in FIGS. 1, 2, 3, and 4 and includes a cylindrical shell 10 defining a confined elongated chamber or zone 11 which, when practicing the present invention, may conveniently be of circular cross-section and of uniform diameter throughout its length. For assembly purposes, the shell 10 may be made up of a plurality of sections 12, 13, 14, 15, and 16 each provided at opposite ends with externally extending circumferential flange means for cooperating with the flange means of adjacent sections to rigidly secure the sections together in a unitary structure by suitable connection means such as by bolts, for example. Cooperating flange means 17, 17 join the sections 12 and 13 and the sections 13, 14, 15, and 16 are joined by cooperating flange means 18 and 19. The rectifying unit includes a shaft 20 preferably made up of shaft sections 21 having splined ends 22 and connected together in axial relation by cooperating splined couplings 23. The shaft 20 is rotatably mounted within the chamber 11 in alignment with the central longitudinal axis of the shell 10 by means of bearings 24 and 25 located at opposite ends of the shaft sections. As shown in FIG. 3, the bearings 24 is supported by coplanar, radially disposed members 26 connected between the housing of bearing 24 and the wall of the section 13 while, as shown in FIG. 2, the bearing 25 is supported by coplanar, radially disposed members 27 connected between the housing of bearing 25 and the wall of the section 12. Each of the bearing supporting members 27 is of hollow cross-section presenting an internal passageway 28 and extends radially beyond the outer surface of the section 12 and joined to a liquid inlet conduit 29. Each member 27 also includes a plurality of liquid discharge nozzles 30 in fluid communication with the internal passageway 28 and having openings discharging into the chamber 11. The nozzles 30 of the members 27 are designed to produce a highly atomized jet of liquid and each orifice is positioned to direct the jet in the same direction substantially axially of the shell 10, the direction being to the left as viewed in the drawing. The contact region of the rectification unit includes the discharge orifices 30 and comprises the portion of the chamber 11 which begins in front of the orifices and extends to the right, as viewed in the drawings, to the general location of the bearing 24.

The phase separation and pumping region of the rectification unit extends generally from the location of the bearing 24 through the sections 14 and 15 and includes three stages of liquid-vapor separation and liquid pumping. Each stage includes a rotating element to effect phase separation and a rotating element to effect liquid pumping, and the rotating elements of the stages are mounted on the shaft section 21 between bearings 24 and 25 for rotation therewith. The rotating element of the first stage for effecting phase separation comprises a continuous surface, radially protruding member 31 secured to the shaft 21. The member 31 includes an external conical surface or compression cone 32 inclined at a shallow angle relative to the axis of the shaft and an external conical surface or expansion cone 33 inclined at a steep angle to the axis of the shaft and in a direction opposite the direction of inclination of the surface 32. The surfaces 32 and 33 smoothly merge at their adjacent edge portions at the outermost protrusion of the member 31 and their opposite end portions terminate in closely surrounding relationship with the shaft. The rotating element of the first stage for effecting liquid pumping comprises pump member 34 which, as shown in FIG. 4, includes an annular pump wheel 35 supported by spokes 36 secured to the hub 37 keyed to the shaft 10. The wheel rotates in a plane perpendicular to the axis of the shaft and includes a plurality of pump vanes 38 mounted on the side surface of the wheel which faces in a direction toward the surface 33 of the radially protruding member 31. The outer periphery of the wheel extends through a slot in the wall of the shell 10 into a volute discharge chamber 39 formed externally of the shell 10 by the cooperating flanges 18 and 19, the discharge chamber being connected to a discharge conduit 40. The second stage includes a continuous radially protruding member 41 having a gradually inclined conical surface or compression cone 42 followed by an oppositely, abruptly inclined surface or expansion cone 43, similar to the member 31, and a pump member 44 provided with pump vanes 45, a volute discharge chamber 46 and a discharge conduit 47, similar to the arrangement of the first stage. Likewise, the third stage includes a similar continuous radially protruding member 48 having oppositely inclined conical surfaces 49 and 50, or compression and expansion cones, respectively, and a similar pump member 51 including pump vanes 52, a volute discharge chamber 53 and a discharge conduit 54. The bearings 24 and 25 may be lubricated directly from liquid in the passageway 28. A transfer pipe 56, having an open end 57 within the passageway 28 facing in the direction of liquid flow, conducts liquid through a passageway 58 in a supporting member 26 for lubricating the bearing 24 through a suitable opening formed in the bearing housing. The bearing 25 may be supplied with liquid directly from the passageway 28 through a suitable opening formed in the bearing housing. It will be noted that the inner ends of the pump vanes 38, 45 and 52 are located a radial distance from the axis of the shaft corresponding to the maximum protrusion of the members 31, 41 and 48 relative to the shaft and, for reasons discussed below, that the pump members are designed to possess progressively decreasing capacity. The angular disposition of the surfaces 32 and 33 may vary; however, the surface 32 should be gradually inclined in the direction of flow and the surface 33 oppositely inclined, preferably at a steeper angle. The speed of rotation of the shaft may vary from 100 to 10,000 r.p.m. depending upon variables including the size of the equipment, the specific liquid and vapor being processed, and the operating temperature and pressure.

As an operating example of the rectification unit of the type shown in FIG. 1, the shaft 20 is rotated at about 3600 r.p.m. by any suitable means, not shown, saturated vapor of an oxygen-nitrogen mixture flows under pressure and high velocity into the chamber 11 at the left-hand end of cylindrical shell 10, as viewed in the drawing and as indicated by arrows 59, and liquid of an oxygen-nitrogen mixture is fed under pressure to conduits 29 connected to the hollow bearing supporting members 27. While the liquid and vapor contain the same components of a binary mixture, it is to be understood the present invention may be practiced to separate mixtures including more than two components or otherwise process liquids and vapors containing different components. In the present example, the concentrations of the components of the liquid and vapor are different and it will be assumed the vapor contains a higher percentage of the high boiling point component than the liquid. The vapor enters the chamber 11 under a pressure of about 50 p.s.i. and at a velocity of about 100 feet per second, while the liquid is delivered to the conduits 29 under about 90 p.s.i. to maintain about a 40 p.s.i. pressure differential across the nozzles 30. The liquid is discharged from the nozzles as a highly atomized mist directly into the path of the oncoming high velocity vapor; the liquid being atomized to about 35 micron diameter drops although, when practicing the present invention, the liquid drops may vary in size from 10 to 1000 microns. The vapor flows at a high velocity relative to the velocity of the atomized liquid discharged from the nozzles and the drag forces of the vapor cause the droplets of liquid to reverse their direction of flow and to be accelerated and flow along with the vapor, from left to right as viewed in the drawing, through the contact region. The liquid and vapor are thoroughly intermixed due to the high degree of atomization of the liquid, the violent collision between countercurrently flowing high velocity vapor and atomized liquid discharged from the nozzles and the severe turbulence resulting from the change in direction and acceleration of the liquid droplets. As a consequence of the thorough liquid and vapor intermixing, mass transfer of a high order of efficiency of 92–95% occurs in the contact region, and a stable liquid-vapor mixture in a high degree of equilibrium exits from the contact region.

The liquid-vapor mixture flows into the phase separation and pumping region under high velocity and impinges upon the compression cone 32 of the member 31 which is rotating at high speed. The rotating surface 32 imparts rotation to the liquid-vapor mixture and, due to centrifugal forces, the heavier liquid particles are forced radially outwardly into an annular region about the inner wall surface of the section 13. Due to the inclination of the conical surface 32 in the direction of flow, the pressure and velocity of the mixture increases as the flow proceeds along the surface and, at the point of maximum protrusion of the member 31, the mixture will be at very high velocity and will be confined in an annular space adjacent the inner wall surface of section 13, corresponding to the radial dimension of the vanes 38, with the liquid concentrated in the outer regions of the annular space. As the flow proceeds beyond the surface 32, the pressure of the mixture will abruptly drop due to the opposite, steeply inclined surface 33, and a separation of the phases will occur with the relatively light vapor flowing inwardly toward the shaft and through the open space between the spokes of the pump member 34 into the next stage, while the heavier liquid, for the most part, continues its direction of flow into contact with the pump vanes 38, rotating at high speed, which collect the liquid and eject the collected liquid at high velocity into the discharge chamber 39 where the kinetic energy is converted to pressure energy and the liquid is delivered under pressure to the discharge conduit 40. A major portion of the liquid, about 60%, is removed from the mixture in the first stage and the mixture containing the total vapor and a minor part of the liquid enters the second stage and impinges upon the compression cone 42 of the rotating member 41 and then through the second stage which operates upon the mixture in a manner similar to the first stage, as described above, to remove substantially the total of the remaining liquid, about 35% of the total liquid, which is delivered under pressure to conduit 47. The mixture, now containing only traces of liquid, about 5% of the total liquid, flows through the third stage where the process is repeated to effect removal of the remaining liquid which is delivered under pressure to the discharge conduit 54 while the vapor, essentially free of liquid, flows from the discharge side of the third stage into the region of the chamber 11 to the left of the pumping member 51, as viewed in the drawing. The vapor leaving the last stage has a higher percentage of the low boiling point component relative to the initial vapor entering the rectification unit, while the liquid in discharge conduits 40, 47 and 54 has a lower percentage of the low boiling point component relative to the liquid fed to the conduit 29. In view of the high efficiency of the mass transfer and obtaining a liquid-vapor mixture of a high order of equilibrium, a substantial difference in the composition is obtained.

The rectification unit shown in FIGS. 1, 2, 3, and 4 of the drawings may be utilized to effect a composition change in a liquid or a vapor in the manner described above and, as will be discussed in detail below, the contact region may be used separately to form a liquid-vapor mixture or the phase separation and pumping region may be employed independently to effect phase separation of a liquid-vapor mixture. In addition, in accordance with one of the objects of the present invention, a plurality of the rectification units may be used in series to effect separation of a gaseous mixture. With reference to FIG. 1, the rectification unit illustrated therein may be an intermediate rectification unit of a plurality of similar rectification units connected in a series. Thus, the vapor entering the left-hand end of the chamber 11 as indicated by the arrows 59 may comprise the vapor of a gaseous mixture partially rectified by one or a plurality of preceding rectification units, while the vapor delivered from the last stage of the phase separation and pumping region may be delivered to the contact region of the next rectification unit of the series such as into the section 16 including hollow members 17 and discharge nozzles 30 therein which form a part of the contact region of the next succeeding rectification unit. With the rectification units connected in series relationship, the vapor discharged from each rectification unit flows directly into the contact region of the next rectification unit of the series, the vapor leaving the last rectification unit comprising the low boiling point fraction produced by the series of rectification units. In such a series of rectification units, the liquid discharged from the phase separation and pumping region of each unit, except the first rectification unit of the series located at the end of the series where the vapor is rich in high boiling point component, is introduced into the contact region of the preceding rectification unit of the series. Thus, with reference to FIG. 1, the liquid under pressure in the dicharge conduits 40, 47 and 54 is merged in a single conduit 60 and introduced thereby into the contact region of the preceding rectification unit of the series, that is, the rectification unit providing the vapor indicated by the arrows 59, while the liquid under pressure fed to the contact region is derived from the phase separation and pumping region of the next succeeding rectification unit of the series, namely the rectification unit of which the section 16 forms a part of the contact region, and is introduced by the conduit 29 and into the hollow members 27 which are supported by the section 12. While the members 27 supported by the section 16 carry the bearing 25 in which the outer end of the shaft section 21 rotates, it will be appreciated that such members 27 do not otherwise form a part of the rectification unit shown in FIG. 1. The foregoing will be more fully appreciated from FIG. 5 of the drawings which is a diagrammatic presentation of a novel fractionating cycle embodying series of rectification units of the type shown in FIG. 1.

With reference to FIG. 5, the novel low temperature fractionating cycle comprises a high pressure fractionating zone 80 and a low pressure fractionating zone including stripping zone 81 and scrubbing zone 82. The zones 80, 81 and 82 are made up of a series of rectification units 83 of the type shown in FIG. 1 with the cylindrical shells of the rectification units forming the hollow elongated cylindrical vessels 84, 85 and 86 which define the zones 80, 81 and 82, respectively. Each of the rectifying units 83 includes a rotating element 87, a liquid spray header 88 and a plural liquid discharge outlet 89. The rotating elements 87 diagrammatically represent the protruding members 31, 41 and 48 and the pump members 34, 44 and 51 of the three stage phase separation and pumping region of the rectification unit of FIG. 1; the liquid spray header 88 diagrammatically represents the hollow members 27 and nozzles 30 of the contact region of the rectification unit of FIG. 1; and, the plural liquid discharge outlet 89 diagrammatically represents the discharge conduits 40, 47 and 54 of the rectification unit of FIG. 1. In each of the zones 80, 81 and 82, the rotating elements 87 of the series of rectifying units 83 are mounted on a rotatable shaft extending longitudinally of the cylindrical vessel defining the zone; the rotating elements of the series of rectifying units of zone 80 being mounted on a common shaft 90 rotated by motor 91; the rotating elements of the series of rectifying units of zone 81 being mounted on common shaft 92 rotated by motor 93; and, the rotating elements of the series of rectifying units of the zone 82 being mounted on common shaft 94 rotated by motor 95. Also, the plural liquid discharge outlet 89 of each rectification unit of the series of rectification units in the zones 80, 81 and 82, except the first rectification unit of each series located at the high boiling point component rich end of the zones, is connected by a conduit 96 to the liquid spray header 88 of the preceding rectification unit of the series. Gaseous feed mixture is introduced into the first rectification unit of the zone 80, located at the lower end of the cylindrical vessel 84 as viewed in the drawing, by a conduit 97, and the gaseous mixture is partially separated in the zone 80 producing a gaseous low boiling point fraction discharged from the last rectifying unit of the zone 80 at the top of the vessel 84, as viewed in the drawing, and withdrawn from the zone 80 by a conduit 98, and a liquid high boiling point fraction withdrawn from the discharge outlet 89 of the first rectification unit by conduit 99. The liquid high boiling point fraction is passed by the latter conduit to passageway 99a of heat exchange device 100 for heat interchange with relatively cold fluid in the shell space 101 and then conducted by conduit 102 to pressure reduction valve 103 connected by conduit 104 to the liquid spray header 88 of the last rectification unit of the zone 81, at the upper end of the vessel 85 as viewed in the drawing, which comprises the feed point of the low pressure zone. The zones 81 and 82 are connected at the feed point by a vapor conduit 105 which conducts vapor discharged from the last rectification unit of the zone 81 to the inlet of the first rectification unit of the zone 82, and the liquid discharge outlet 89 of the first rectification unit of the zone 82 is connected by conduit 106 to conduit 104 for flow to the liquid spray header 88 of the last rectification unit of the zone 81. In the low pressure zone, separation of the gaseous mixture is continued producing liquid high boiling point product withdrawn from the liquid discharge outlet 89 of the first rectification unit of the zone 81, located at the bottom of the vessel 85 as viewed in the drawing, by conduit 107, and gaseous low boiling point product discharged from the last rectification unit of the zone 82, located at the top of the vessel 86 as viewed in the drawing, by a conduit 108. The conduits 97, 98, 105, and 108 have a cross-sectional area substantially corresponding to the cross-sectional area of the inlet or outlet of the rectification unit to which they are connected and the showing of such conduits as lines is for the purpose of simplifying the drawing. The gaseous low boiling point component is passed by conduit 108 to the shell side 101 of heat exchange device 100 and then by conduit 109 for flow through passageway 110 of heat exchange device 111, the gaseous low boiling point fraction being withdrawn from the passageway 110 by conduit 112. The head exchanged device 111 includes passageway 113 through which compressed gaseous mixture, introduced by conduit 114, flows in countercurrent heat interchange with relatively cold gaseous low boiling point product in passageway 110. The cooled gaseous mixture is passed by conduit 115 to expansion valve 116 and then by conduit 117 to the feed inlet conduit 97. To provide refrigeration for the process, a part of the gaseous mixture is withdrawn from the passageway 113 by conduit 118, expanded with production of external work in expansion engine 119, and effluent of the expansion engine passed by conduit 120 to the feed inlet conduit 97.

Reflux liquid is fed to the zone 80 by conduit 121 connected to the liquid spray header 88 of the last unit of the series of rectification units in that zone, and liquid is fed by conduit 122 to the liquid spray header 88 of the last rectification unit of the series of the zone 82 to provide reflux for the low pressure zone. The reflux liquid for both zones is obtained in part by liquefaction of the gaseous low boiling point fraction by heat interchange with the liquid high boiling point product in a condenser-evaporator 123 including a passageway 124 for the gaseous low boiling point fraction connected to the conduit 98 and a passageway 125 for the liquid high boiling point product connected to the conduit 107. The heat interchange in the condenser-evaporator 123 results in liquefaction of the gaseous low boiling point fraction which is withdrawn by conduit 126 and partial vaporization of the liquid high boiling point product. The liquid-vapor mixture of high boiling point product is withdrawn from the passageway 125 by conduit 127 and fed thereby to a phase separator 128 located at the lower end, as viewed in the drawing, of the vessel 85. The phase separator 128 is similar to the portion of the rectification unit of FIG. 1 which comprises the phase separation and pumping zone and includes a rotating element 87 secured to the shaft 92 and a plural liquid discharge outlet 89. The vapor discharged from the phase separator is fed directly to the first rectification unit of the zone 81 and the liquid discharge outlet is connected to conduit 129 which delivers liquid high boiling point product of the cycle. The liquefied low boiling point fraction in conduit 126 is divided at point 130 with a first part sufficient to meet the reflux requirements of the zone 80 being fed by conduit 131 to pump 132 which discharges into the conduit 121, the pump functioning to increase the pressure of the liquid to establish the required pressure differential across the nozzles in the liquid spray header of the last rectification unit of the zone 80. The remaining liquefied low boiling point fraction is conducted by conduit 133 to pressure reducing valve 134 and hence by conduit 135 to the conduit 122; the valve 134 being set to establish a pressure sufficient to provide the required pressure differential across the nozzles of the last rectification unit of the zone 82. Additional reflux for the zone 82 is obtained by a refrigeration system 136 which functions to liquefy a part of the gaseous low boiling point product withdrawn from the zone 82 by conduit 108. As shown, a stream of the gaseous low boiling point component is passed by conduit 137 for flow through passageway 138 of heat exchange device 139 and thereby warmed to ambient temperature. The pressure of the warmed stream is increased by compressor 140 and the compressed stream is cooled upon flowing through passageway 141 of the heat exchange device 139, expanded in valve 142 to about the pressure of the gas in conduit 108 to effect its partial liquefaction, and then fed to phase separator 143. The unliquefied portion is withdrawn from the phase separator by conduit 144 and returned to the conduit 108 while the liquefied portion is withdrawn by conduit 145 to pump 146 which discharges the liquid into conduit 122 under a pressure to provide the required pressure differential across the nozzles of the last rectification unit of zone 82. If desired, the pump 146 may be eliminated by expanding the fluid in valve 142 to the pressure required by the liquid spray header and by placing an expansion valve in the conduit 144.

The fractionating cycle disclosed in FIG. 5 of the drawings is designed for producing liquid high boiling point component of the gaseous mixture under pressure, such liquid product being withdrawn from the cycle by conduit 129. As an operating example, it will be presumed that the gaseous mixture is atmospheric air; however, it is to be understood that the principles of the present invention may be employed to separate other gaseous mixtures. Atmospheric air previously treated to remove carbon dioxide and other high boiling point impurities enters the cycle by way of conduit 114 under a pressure of about 2000 p.s.i.a., is cooled upon flowing through the passageway 113 of the heat exchange device 111 and then expanded in valve 116 to a pressure of about 248 p.s.i.a. and a temperature of about −252° F. A portion of the air is expanded in the expansion engine 119 to the same pressure and the total of the expanded air is introduced by conduit 97 into the lower or high boiling point rich end of the fractionating zone 80 at a pressure of about 248 p.s.i.a. at or close to saturation temperature of about −252° F. The fractionating units 83 of the zone 80 operate in a manner described above to effect partial separation of the air into a gaseous low boiling point fraction consisting essentially of nitrogen withdrawn from the top of the zone 80 by conduit 98 at a pressure of about 240 p.s.i.a. and a temperature of about −255° F., and a liquid high boiling point fraction containing about 40% oxygen withdrawn from the first rectification unit by conduit 99 at a pressure of about 290 p.s.i.a. and a temperature of about −252° F. The liquid crude oxygen is cooled to about −266° F. upon flowing through the heat exchange device 100 and then reduced in pressure in the valve 103 to about 72 p.s.i.a. and then introduced by conduit 104 into the liquid spray header of the first rectification unit of the zone 82 at a temperature of about −285° F. as feed to the low pressure fractionating zone wherein the separation is continued producing low boiling point product withdrawn from the top of the zone 82 by conduit 108 at a pressure of about 25 p.s.i.a. and a temperature of about −312° F. and liquid high boiling point component discharged from the first rectification unit of the zone 81 by conduit 107 at a pressure of about 76 p.s.i.a. and a temperature of about −262° F. The gaseous high boiling point fraction is completely liquefied in the condenser-evaporator 123 with the liquefied low boiling point fraction flowing from the condenser-evaporator in conduit 126 at a pressure of about 240 p.s.i.a. and a temperature of about −255° F. and is then divided at point 130 with about three parts flowing to the pump 132 and one part flowing to the pressure reducing valve 134. The pump 132 increases the pressure of the liquid to about 280 p.s.i.a. which is delivered by conduit 121 to the liquid spray header of the last fractionating unit of the zone 80 while the valve 134 reduces the pressure of the liquid to about 64 p.s.i.a. which is delivered by conduits 135 and 122 to the liquid spray header of the last rectification unit of the zone 82. The liquid high boiling point component is partially vaporized upon flowing through passageway 125 of the condenser-evaporator 123 and the resulting liquid-vapor mixture is separated in the phase separator 128 from which the liquid is delivered in conduit 129 at a pressure of about 76 p.s.i.a. and a temperature of about −262° F., while the vapor is delivered directly to the first rectification unit of the zone 81. The liquefaction system 136 is operated at conventional pressures to provide a quantity of liquefied low boiling point product to satisfy the reflux requirements of the low pressure zone and such liquid is delivered by the pump 146 at a pressure of about 64 p.s.i.a. into the conduit 122. The gaseous low boiling point product is slightly warmed upon flowing through the shell side 101 of the heat exchange device 100 and upon flowing through the passageway 110 of the heat exchange device 111 is warmed to ambient temperature and is withdrawn from the cycle by conduit 112 at substantially atmospheric pressure.

A novel rectifying unit constructed in accordance with another embodiment of the invention is disclosed in FIGS. 6, 7 and 8 of the drawings. In FIG. 6, two complete rectifying units 150 and 151 and a part of a third unit 152 are shown to illustrate the manner the units are connected in series, similar elements of the rectifying units being identified by corresponding reference characters. The rectifying unit includes a cylindrical shell 153 defining a chamber or zone 154 including a contact region containing liquid spray means 155 and a separation and pumping region containing a rotating element 156. As seen more clearly in FIG. 7, the liquid spray means 155 includes four elongated members 157, each having an internal passageway 158, joined to the shell 153 and extending from an inlet end 159 located outside the shell radially into the chamber 154 in quadrature relationship with their inner ends joined together in a hub 160 concentric with the central longitudinal axis of the shell. The elongated members 157 are located in a common plane perpendicular to the longitudinal axis of the shell 153 and a plurality of discharge nozzles 161 are located on opposite side surfaces of each elongated member 157. The nozzles 161 extend in spaced relation substantially throughout the radial dimension of each elongated member within the chamber 154 and are in fluid communication with the passageways 158 to discharge highly atomized jets of liquid 162 into the chamber 154 in directions generally perpendicular to the central longitudinal axis of the shell 153 from opposite sides of each of the elongated members. The hubs 160 of the elongated members 157 each carry a bearing 163 for rotatably supporting a shaft 164 extending between the elongated members of successive rectification units, the shafts 164 of the units being connected in axial relation by splined ends 165. The shaft 164 extends longitudinally of the separation and pumping region and carries the rotating element 156. The rotating element 156 includes a plurality of liquid collecting and pumping rings 166, 167, 168, 169, and 170, of different diameters, rigidly carried by the shaft 164 in concentric relation, spaced parallel to the longitudinal axis of the shaft in the order of increasing diameters in a direction away from the liquid spray means 155, that is, in the direction of flow through the chamber 154. Each of the collecting and pumping rings includes a liquid diverting surface 171 located on the side of the ring which faces in a direction toward the liquid spray means 155 to be impinged upon by fluid flowing from the liquid spray means in a direction toward the liquid collecting and pumping rings, and each of the surfaces 171 extends circumferentially about respective rings and are shaped to change the direction of flow of fluid impinged upon the surfaces from a generally axial flow to radial flow. As shown more clearly in FIG. 9, the surfaces 171 include a first or entry portion 172 disposed in generally parallel relation with the axis of the shaft, an exit portion 173 disposed in perpendicular relation to the shaft axis and an intermediate curved portion 174 smoothly merging the inlet and exit portions. Each ring 166, 167, 168, 169, and 170 includes a plurality of pumping vanes 175 located on its surface 171 adjacent the outer margin of the exit surface portion 173 which function to discharge collected liquid radially of the longitudinal axis of the shaft. The pumping vanes of the rings 166, 167, 168, and 169 discharge into the chamber 154 while the pumping vanes of the ring 170 discharge through circumferential openings 176 formed in the shell 153 into semi-circular volute discharge passageways 177 located externally of the shell 153 and having discharge openings 178. As shown in FIG. 6, the large diameter ring 170 may be connected by spokes 179 joined to an elongated sleeve 180 keyed to the shaft 164 and the small diameter ring 166 may comprise a plate keyed to the sleeve. The rings 167, 168 and 169 of intermediate diameter may be carried by angularly disposed supports 181 connected between the ring 166 and the outer periphery of the ring 170. As seen from FIGS. 6 and 8, the diameters of the rings 166, 167, 168, 169, and 170 and their respective surfaces 171 are relatively sized so that the outer periphery of each ring, except the large diameter ring 170, is radially spaced from the axis of the shaft 164 by a distance corresponding to the radial location of the entry portion 172 of the surface 171 of the next ring of the series. With this relationship, the combined surfaces 171 of the rings 166, 167, 168, 169, and 170 present substantially a continuous surface disposed in the chamber 154 between the shaft 164 and the inner wall of the shell 153 and facing in a direction toward the liquid spray means 155 in the path of fluid flow therefrom, that is, from left to right as viewed in the drawings.

In operation of the rectifying unit shown in FIGS. 6, 7, 8, and 9, the shaft 164 is rotated at high speed and vapor of a gaseous mixture enters the left-hand end of the chamber 154 defined by the shell 153 as indicated by arrows 182. Liquid of the gaseous mixture of a composition different from the vapor and under suitable pressure is fed through the inlet ends 159 and into the passageways 158 of each of the elongated members 157. Jets of highly atomized liquid are discharged from the orifices 161 in a direction perpendicular to the direction of flow of the vapor and, as seen from the arrows 162 of FIG. 7, the jets are directed in generally different directions into the vapor flowing past the elongated members 157. This action results in substantially complete surface interaction between the liquid and the vapor and, as the mixture flows onwardly through the contact region, a high order of equilibrium between the liquid and the vapor is obtained. The liquid-vapor mixture, of high stability, flows onwardly to the right into the separation and pumping region and impinges upon the staggered surfaces 171 of the rings 166, 167, 168, 169, and 170 which, as noted above, combine to form a total surface, rotating at high speed, and interposed in the path of the total cross-section of flow of the liquid-vapor mixture. The rotating surfaces 171 effect separation of the liquid and vapor with the liquid being forced radially outwardly in a direction toward the wall of shell 153 while the vapor flows inwardly toward the shaft 164 and does not contact the surface 171 of the next ring. In this regard, the total flow area between adjacent rings is at least equal to the cross-sectional area of the flow entering the separation and pumping zone so as not to impede the flow of separated vapor onwardly through the zone. As the flow of mixture progresses in the direction of rings of increasing diameter, the liquid will move at higher velocity and will be concentrated in an annular zone adjacent the inside surface of the shell 153 and substantially the total liquid of the incoming mixture will impinge upon the surface 171 of the last ring 170 and, by the action of the vanes 175, will be discharged under high velocity into the discharge passageways 177 and delivered from the openings 178 under pressure. The vapor of the liquid-vapor mixture flows inwardly between the rings and longitudinally through the open spaces between the spokes 179 of the ring 170 and leaves the separation and pumping zone essentially free of liquid. When a plurality of rectification units are connected in series, the liquid-free vapor discharged from one unit enters the contact region of the next unit of the series, while the vapor-free liquid, under pressure, is conducted from the outlets 178 to the inlets 159 of the liquid spray means 155 of the preceding unit of the series.

The rectification unit shown in FIGS. 6, 7, 8, and 9 operates at the same order of contact efficiency and separation efficiency as the rectification unit shown in FIG. 1 while obtaining additional advantages. The open structure of the rings 166, 167, 168, 169, and 170 results in a relatively small spressure drop across each rectifying unit which makes it possible to perform a fractionating operation in a zone embodying a plurality of such units with a relatively small pressure gradient between the high boiling point rich and low boiling point rich ends of the zone thereby increasing the overall efficiency of the operation. The speed of rotation of the rotating element 156 may vary from 30 to 3000 r.p.m., depending upon the variables discussed above in connection with FIG. 1, which range is substantially less than the range of rotating speeds of the rectification unit of FIG. 1, thus reducing power requirements and design problems attendant elements rotating at high speeds. Also, the compact structure permits a large number of units to be connected in series within a relatively short space as compared to the rectifying unit of FIG. 1, is of simpler construction and of lighter weight.

FIG. 10 and 11 of the drawings diagrammatically illustrate the manner a series of rectification units A, B, C, D, and E of the type shown in FIG. 6 may be interconnected to effect a fractionating operation; it is understood the number of units employed will depend upon the gaseous mixture and the extent of separation desired and that the number of units illustrated is exemplary. The cylindrical shells 153 of the rectifying units are connected together in end-to-end relation to provide an elongated cylindrical vessel defining a fractionating zone. The gaseous mixture to be separated enters the fractionating zone at the high boiling point rich end, the left-hand end as viewed in the drawing, as indicated by arrows 190, and the flow through the fractionating zone is from left to right with gaseous low boiling point product flowing from the low boiling point rich end, the right-hand end as vewed in the drawing, as indicated by arrows 191. Liquid high boiling point product is withdrawn from the discharge passageways 177 of the rectifying unit A by conduits 193. Liquid reflux is fed to the liquid spray means 155 of the rectifying unit E by conduits 194 connected to the fluid inlets 159 of the four elongated members 157, the conduits 194 being connected to a common conduit, not shown, communicating with the liquid reflux source. Liquid under pressure delivered by the discharge passageways 177 of each of the rectifying units except the first rectifying unit A is fed to the liquid spray means 155 of the preceding rectifying unit of the series. This may be accomplished by a conduit connected to the discharge outlet 178 of each discharge passageway 177, and feeding a pair of conduits connected to a pair of fluid inlets 159 of the liquid spray means of the preceding rectification unit and, in order to facilitate the conduit connections, the rectification units, with respect to the discharge passageways 177, may be successively disposed in different angular positions. Thus, as shown in FIG. 10, one of the fluid outlets 178 of the fractionating unit E is connected by conduit 195 and branch conduits 196 to an adjacent pair of fluid inlets 159 of the liquid spray means 155 of the rectifying unit D. On the opposite side of the apparatus shown in FIG. 10, the other fluid outlet 178 of the rectifying unit E is connected in a similar manner to the remaining pair of fluid inlets 159 of the rectification unit D by conduit 197 and branch conduits 198 as seen in FIG. 11. In a similar manner, the fluid outlets 178 of the rectifying units D, C and B are connected to the fluid inlets 159 of the rectification units C, B and A, respectively. Since the rectification unit E is the last unit of the series, the shaft 164 is supported in a bearing carried by radially disposed members 199 joined to the shell 153.

A fractionating cycle constructed in accordance with another embodiment of the invention and incorporating the novel rectification units disclosed in FIG. 6 is shown in FIG. 12 of the drawings including a high pressure fractionating zone 200 and a low pressure fractionating zone including a stripping zone 201 and a scrubbing zone 202. The high pressure zone 200 includes a plurality of rectification units 203 of the type shown in FIG. 6 with the rotating elements 156 being mounted on a common shaft 204 rotated by motor 205 and with the discharge passageway of each rectification unit of the series being connected by conduits 206 to the liquid spray means 155 of the preceding unit of the series, preferably in a manner as disclosed in FIGS. 10 and 11. The gaseous mixture to be separated is introduced into the entry end of the series, at the high boiling point rich end of the zone 200, by conduit 207 and the series of rectification units 203 function in a manner described above to effect partial separation of the gaseous mixture into a gaseous low boiling point end of the zone 200 by conduit 208 and a liquid high boiling point fraction withdrawn from the discharge passageway 177 of the first rectification unit of the series by conduit 209. The stripping zone 201 and the scrubbing zone 202 each include a series of the rectification units 203 interconnected by conduits 206 in a manner similar to the rectification units of the high pressure zone 200 and the rotating elements 156 of the rectification units of the stripping zone are mounted on a common shaft 210 rotated by motor 211 while the rotating elements 156 of the rectification units of the scrubbing zone 202 are mounted on a common shaft 212 rotated by motor 213. The liquid high boiling point fraction is flowed by conduit 209 through passageway 214 of heat exchange device 215 and thereby cooled by heat interchange with relatively cold fluid flowing through the shell space 216 of the heat exchange device and then conducted by conduit 217 to a turbine type pressure reducing device 218 from which the liquid is discharged under reduced pressure in conduit 219 and fed to an eduction device 220. The eduction device is connected by conduits 221 and 222 between the discharge passageway 177 of the first rectification unit of the zone 202 and the liquid spray means 155 of the last rectification unit of the zone 201 and vapor discharged from the latter rectification unit is introduced by conduit 223 to the inlet of the first rectification unit of the zone 202. The rectification units of the zones 201 and 202 function to complete the separation producing liquid high boiling point product withdrawn from the discharge passageway 177 of the first rectification unit of the zone 201 by conduit 224 and gaseous low boiling point product withdrawn by conduit 225 from the last rectification unit of the zone 202. The gaseous low boiling point product is conducted by conduit 225 for flow through the shell space 216 of the heat exchange device 215 and then by conduit 226 for the flow through passageway 227 of heat exchange device 228 from which the gaseous low boiling point product is withdrawn by conduit 229 at substantially ambient temperature and pressure. Gaseous mixture, which enters the cycle by conduit 230, is cooled upon flowing through passageway 231 of the heat exchange device 228 in countercurrent heat interchange with the relatively cold gaseous low boiling point product in the passageway 227 and the cooled gaseous mixture is passed by conduit 232 to expansion valve 233 connected to the conduit 207. For the purposes of providing refrigeration for the process, gaseous mixture is withdrawn from the passageway 231 by conduit 234, expanded with work in expansion engine 235 and then merged by conduit 236 with the cooled gaseous mixture from the valve 233 and fed therewith to the zone 200 by way of the conduit 207.

Liquid reflux for the fractionating zones is obtained in part by liquefaction of the gaseous low boiling point fraction by heat exchange with the liquid high boiling point product in a condenser-evaporator 237 having a passageway 238 connected at one end of the condenser-evaporator to the conduit 208 and a passageway 239 connected at the other end of the condenser-evaporator to the conduit 224. The liquefied gaseous low boiling point fraction leaves the coil 238 by conduit 240 and is divided at point 241 with a major portion flowing by conduit 242 to the inlet of pump 243 and the remainder flowing by conduit 244 to eductor device 245. The pump 243 functions to raise the pressure of the liquid to the value required to establish the necessary pressure differential across the nozzles of the liquid spray means 155 of the last rectification unit of the zone 200 and the pressurized liquid is conducted by conduit 246 to such liquid spray means. The eductor device 245 functions to reduce the pressure of the liquid to a value required to establish the necessary pressure differential across the nozzles of the liquid spray means 155 of the last rectification unit of the zone 202 and the liquid under reduced pressure is fed to such a liquid spray means by conduit 247. Additional reflux for the low pressure fractionating zone is obtained by liquefying a part of the gaseous low boiling point product fed by conduit 248 to a conventional liquefaction system 249 which may be similar to the system 136 of FIG. 5 including a heat exchange device 250, a compressor 251, an expansion valve 252, and a phase separator 253 having a vapor connection by conduit 254 returning unliquefied vapor to the conduit 225 and a liquid connection by conduit 255 to the eductor device 245 which functions to increase the pressure of the liquid and feed the liquid into the conduit 247. The liquid high boiling point product is partially vaporized in the passageway 239 of the condenser-evaporator 237 upon effecting liquefaction of the gaseous low boiling point fraction and the liquid-vapor mixture of high boiling point product is fed by conduit 256 to the inlet of phase separator 257 located at the lower end of the zone 201, as viewed in the drawing. The phase separator 257 corresponds to the separation and pumping zone of the rectification unit shown in FIG. 6 and includes a discharge passageway 177 and a rotating element 156 carried by the shaft 210. Vapor discharged from the phase separator 257 is fed to the inlet of the first rectification unit of the zone 201 and separated liquid is withdrawn from the discharge passageway 177 by conduit 258.

The expansion engine 218 produces external work which is utilized to drive the pump 243 by a mechanical connection 259. This feature, together with the feature of utilizing the eductor device 245, reduces the power requirements of the cycle. The eduction device 245 eliminates the need of the pump 146 of the FIG. 5 cycle and the power required for its operation. The eduction device 220 effects more complete mixing of the liquid in conduits 219 and 221.

The operating example given above for the cycle of FIG. 5 is generally applicable to the cycle of FIG. 12. In view of the small pressure drop presented by the rectification unit of FIG. 6, a pressure drop equal to about 25% of the pressure drop of the rectification unit of FIG. 1, there will exist less pressure difference between the input and output ends of the zones 200, 201 and 202, with commensurate temperature changes, relative to the foregoing operating example of the FIG. 5 cycle. Thus, the cycle of FIG. 12 operates as higher efficiency requiring less power to effect the same separation in addition to the power savings resulting from the use of the expander energy and the eduction devices 220 and 245 discussed above.

There is thus provided by the present invention a novel method of and apparatus for effecting liquid-vapor contact to obtain mass transfer and equilibrium condiitons with a high degree of efficiency for use in combination with a novel method of and apparatus for separating gaseous mixtures so characterized to adapt the combination for series use in the rectification of gaseous mixtures or other processing of vapors and liquids.

Although several embodiments of the invention have been disclosed and described herein, it is to be expressly understood that various changes and substitutions may be made therein without departing from the spirit of the invention as well understood by those skilled in the art. Also, although the novel methods and apparatus are disclosed in the environment of low temperature processes, it will be understood the principles of the invention may be used in the performing of high temperature processes. Reference therefor will be had to the appended claims for a definition of the limits of the invention.

We claim:
1. Method of contacting a liquid and a vapor to provide a liquid-vapor mixture and of separating the liquid and vapor phases of the mixture comprising the steps of:
    flowing a first vapor into a contact region of a confined elongated zone,
    the first vapor being flowed into the contact region in a first direction extending from one end of the elongated zone to the other end of the elongated zone,
    forming first liquid into a plurality of atomized liquid jets and injecting the atomized liquid jets to within the contact region into contact with the first vapor flowed into the contact region.
    the atomized liquid jets being injected into the contact region in a direction different from the first direction to thoroughly intermix the atomized liquid and the first vapor and provide in the contact region a stable liquid-vapor mixture, introducing the liquid-vapor mixture from the contact region into a separation region of the zone located beyond the contact region relative to the first direction, flowing the liquid-vapor mixture in the first direction through the separation region into contact with a plurality of spaced rotating surfaces located in the separation region and inclined outwardly in the first direction to effect separation of the liquid-vapor mixture into a second liquid flowing radially due to centrifugal forces developed by the rotating surfaces and a second vapor, flowing the second vapor from the separation region in the first direction, and withdrawing second liquid from the separation region radially of the separation region, the said withdrawal being effected by the centrifugal forces at the radial extremity of the separation region.

2. Method of contacting a liquid and a vapor to provide a liquid-vapor mixture and of separating the liquid and vapor phases of the mixture as defined in claim 1 in which the composition of the first vapor is different from the composition of the first liquid.

3. Method of contacting a liquid and a vapor to provide a liquid-vapor mixture and of separating the liquid and vapor phases of the mixture as defined in claim 1:
in which the first vapor comprises a mixture of component gases,
and in which the first liquid comprises a mixture of said component gases in proportions different from the proportions of the first vapor.

4. Method of contacting a liquid and a vapor to provide a liquid-vapor mixture and of separating the liquid and vapor phases of the mixture as defined in claim 1 in which the atomized liquid jets are injected into the vapor in a direction essentially opposite the first direction.

5. Method of contacting a liquid and a vapor to provide a liquid-vapor mixture and of separating the liquid and vapor phases of the mixture as defined in claim 1 in which the atomized liquid jets are injected into the vapor in a direction essentially perpendicular to the first direction.

6. Method of contacting a liquid and a vapor to provide a liquid-vapor mixture and of separating the liquid and vapor phases of the mixture as defined in claim 1 including the step of delivering the separated second liquid under pressure.

7. Method of contacting a liquid and a vapor to provide a liquid-vapor mixture and of separating the liquid and vapor phases of the mixture as defined in claim 1 including the steps of:
flowing the liquid-vapor mixture successively into contact with a plurality of longitudinally spaced rotating surfaces, each inclined in the first direction outwardly from the central region of the zone,
and removing liquid from the zone at spaced points of the zone, each located beyond a rotating surface.

8. Method of contacting a liquid and a vapor to provide a liquid-vapor mixture and of separating the liquid and vapor phases of the mixture as defined in claim 1 including the step of pumping liquid impinged on the rotating surfaces radially of the zone and collecting the pumped liquid and removing the collected liquid from the zone.

9. Method of contacting a liquid and a vapor to provide a liquid-vapor mixture and of separating the liquid and vapor phases of the mixture as defined in claim 8 including the step of collecting the pumped liquid on a rotating surface traversing an outer annular region of the zone and pumping liquid collected on the last-named rotating surface to without the zone.

10. Liquid-vapor process comprising the steps of:
flowing first vapor into the inlet end of an elongated zone in a first direction of flow from the inlet end of the zone to the outlet end of the zone,
introducing liquid into the zone at a plurality of contact regions arranged in series relation and relatively spaced along the length of the zone between the inlet end and the outlet end of the zone,
the first vapor being introduced into the first contact region of the series of contact regions,
the liquid being introduced into each of the contact regions in intermixing relation with vapor flowing in respective contact regions to provide a liquid-vapor mixture discharged from each contact region in the first direction,
flowing liquid-vapor mixture discharged from each contact region into a separation region of a plurality of separation regions arranged in series relation and relatively spaced along the length of the zone with each separation region being located relative to the first direction beyond a contact region,
separating in each separation region the liquid portion flowing radially due to centrifugal forces and the vapor portion of the liquid-vapor mixture flowed to each separation region,
withdrawing from each separation region of the zone the liquid portion separated in each separation region, the said withdrawal being effected by the centrifugal forces at the radial extremity of the separation region,
flowing vapor separated from each separation region into the contact region located relative to the first direction immediately beyond each such separation region,
liquid introduced into each contact region except the last contact region of the series including liquid portion withdrawn from the separation region located in the first direction beyond the next succeeding contact region of the series,
withdrawing from the process vapor portion separated in the last separation region,
and withdrawing from the process liquid withdrawn from the separation region immediately beyond the first contact region of the series of contact regions.

11. Process as defined in claim 10 including the step of introducing liquid into each of the contact regions in the form of a plurality of jets of atomized liquid injected into the vapor flowing through the contact region in a direction different from the direction of vapor flowing through the contact region.

12. Process as defined in claim 11 including the step of withdrawing liquid portion from each separation region under pressure greater than the pressure existing in the contact region to which such withdrawn liquid is introduced.

13. Process as defined in claim 10 including the step of flowing the liquid-vapor mixture in each separation region into contact with rotating surfaces inclined in the direction of flow outwardly from the central region of the zone.

14. Liquid-vapor process as defined in claim 10 in which:
the vapor flowed into the inlet end of the elongated zone comprises a mixture of component gases,
and in which the liquid introduced into the last contact region of the series of contact regions is rich in one component of the mixture of component gases.

15. Liquid-vapor process as defined in claim 10 in which:
the liquid introduced into the last contact region of the series of contact regions comprises a mixture of component gases,
and in which the vapor introduced into the inlet end of the elongated zone is rich in one component of the mixture of component gases.

16. Process as defined in claim 10 in which:
the vapor flowed into the inlet end of the elongated zone comprises a mixture of component gases of different boiling points, and in which the liquid introduced into the last contact region is rich in the low boiling point component of the mixture of component gases.

References Cited

UNITED STATES PATENTS

| | | | |
|---|---|---|---|
| 1,158,066 | 10/1915 | MacLaurin | 261—89 |
| 1,749,260 | 3/1930 | Prétot | 261—89 |
| 1,888,872 | 10/1932 | D'Yarmett | 261—89 |
| 3,406,498 | 10/1968 | Wisting | 261—89X |

NORMAN YUDKOFF, Primary Examiner

R. T. FOSTER, Assistant Examiner

U.S. Cl. X.R.

55—401, 406; 62—9; 261—90

PO-1050
(5/69)

UNITED STATES PATENT OFFICE
CERTIFICATE OF CORRECTION

Patent No. 3,548,568                     Dated December 22, 1970

Inventor(s) John A. Carlson, Jr., Alan H. Singleton, Philip D.S

It is certified that error appears in the above-identified patent and that said Letters Patent are hereby corrected as shown below:

Column 7, line 56, "exchanged" should be --exchange--.
Column 11, line 54, "spressure" should be --pressure--.
Column 12, line 12, "vewed" should be --viewed--;
          line 66, after "point" insert --fraction withdrawn from the low boiling point rich--.
Column 13, line 27, cancel "the".

SIGNED AND
SEALED
MAR 16 1971

(SEAL)
Attest:
Edward M. Fletcher, Jr.
Attesting Officer

WILLIAM E. SCHUYLER, JR.
Commissioner of Patents